Patented Apr. 12, 1927.

1,624,074

UNITED STATES PATENT OFFICE.

EDWARD M. SEARS, OF YAKIMA, WASHINGTON.

METHOD OF REMOVING RESIDUAL POISONS FROM FRUIT.

No Drawing.   Application filed October 21, 1926. Serial No. 143,306.

The invention relates to a method of cleaning fruit and more particularly to a method of removing residual poisons, left as the result of spraying the fruit during the spraying season.

The fruit industry in certain sections of the country has received a serious set-back during the past few years, due to the condemnation of large shipments of the fruit because of the presence of residual poisons, such as lead arsenate, sprayed on the fruit during the growing season. Wide spread efforts are being made to find some way of easily and economically removing this residual poison. Mere wiping of the fruit is insufficient because some of the arsenate remains in the stem and calyx ends of the fruit and no tolerance with respect to the presence of lead arsenate is allowed.

The process of the present invention consists in first dipping the fruit in mineral, animal or vegetable oil, containing one half of one per cent to ninety nine per cent of fatty acid; or fatty acid containing from one per cent to ninety nine per cent of mineral, animal or vegetable oil, the acid rendering the oil soluble in water. The fruit is then dipped in a solution of water made alkaline with one to ten per cent of soda, alkali or ammonia, after which it is washed in clear water.

While I have stated that I dip the fruit it is to be understood that any suitable means may be employed for applying the oil and fatty acid and the alkaline bath to the fruit. That is, the fruit may be sprayed with the solutions instead of being dipped therein, or otherwise.

As an example of the oils that may be employed I may mention: Vegetable oils—corn oil, cottonseed oil, sulphonated oil. Mineral oils—paraffin oil and crystal slab oil. Animal oils—sperm or fish oils.

As an example of the fatty acids that may be employed I may mention: Acids— oelic acid, coco fatty acid and stearic acid.

An important advantage of the process described, is that it leaves a protective film upon the fruit which greatly improves its keeping qualities. In some methods of cleaning fruit heretofore resorted to, the cleaning has resulted in removing part of the natural protective covering of the fruit with consequent loss of keeping qualities. My method leaves a protective coating upon the fruit which improves its keeping qualities.

It is to be understood that the invention is not limited to the precise process set forth but that it includes within its purview anything falling within either the terms or the spirit of the appended claims.

Having described my invention what I claim is:

1. The herein described method of removing poisons from fruit, which consists of applying a solution of oil and fatty acid to said fruit and then washing it.

2. The herein described method which consists of applying a solution of oil and fatty acid to the fruit and then washing the fruit in alkaline water.

3. The herein described method which consists of subjecting fruit to be washed free of arsenate of lead, to the action of a solution of oil and fatty acid in any proportions, then subjecting the fruit to the action of a solution of alkaline water and then washing the fruit in clear water.

In testimony whereof he affixes his signature.

EDWARD M. SEARS.